3,464,024
SELECTION AND CONTROL OF MASER TRANSITIONS BY INHOMOGENEOUS FIELDS
William E. Bell, Palo Alto, and Arnold L. Bloom, Menlo Park, Calif., assignors to Spectra-Physics, Inc., Mountain View, Calif., a corporation of California
Filed Oct. 21, 1963, Ser. No. 317,702
Int. Cl. H01s 1/00
U.S. Cl. 331—94.5    10 Claims

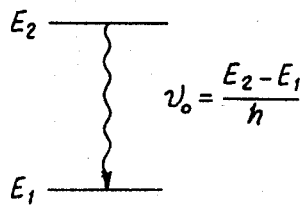
FIG_1
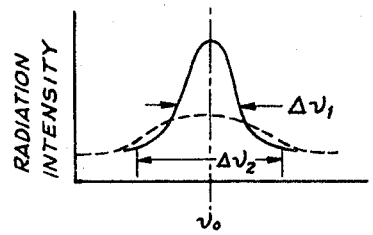
FIG_2
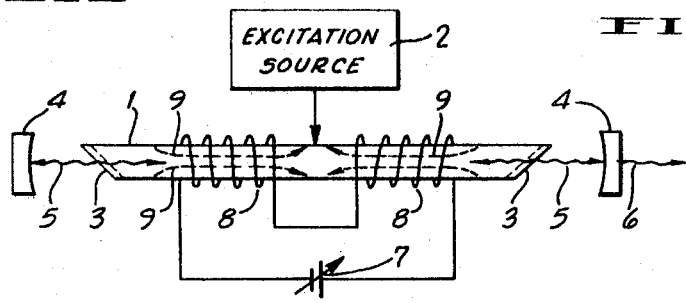
FIG_3
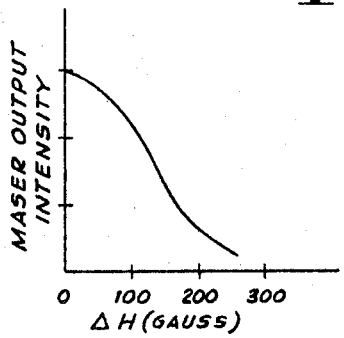
FIG_4
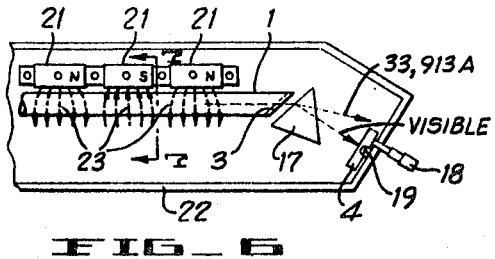
FIG_6
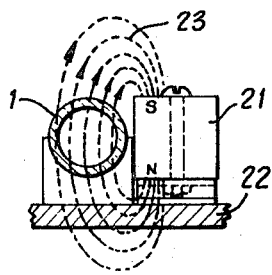
FIG_7
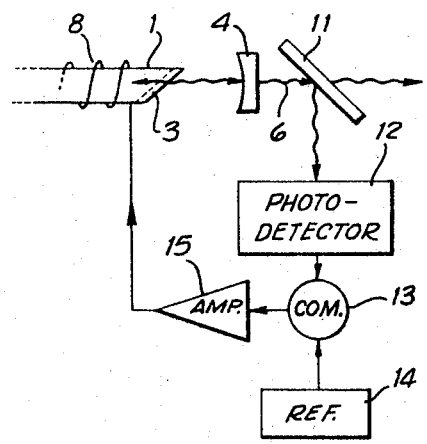
FIG_5
WILLIAM E. BELL &
ARNOLD L. BLOOM
INVENTORS
BY J.E. Rosenblum
ATTORNEY United States Patent Office 3,464,024
Patented Aug. 26, 1969

ABSTRACT OF THE DISCLOSURE

A maser in which the active medium is capable of maser action on at least two transitions, the resonance frequency of one of the transitions being substantially less affected by environmental fields than that of the other transition, and an inhomogeneous field is applied to selectively broaden the radiation linewidth of the other transition. In a described example, the active medium is a helium-neon gas mixture, the one transition is at 6,328 A, and the other transition is at 33,913 A. Since the natural Doppler width of the 6,328 A. transition is approximately six times that of the 33,913 A. transition, an inhomogeneous field will selectively reduce the intensity of maser action at 33,912 A. by line broadening for a range of field inhomogeneities which do not simultaneously broaden the 6,328 A. line. Such an inhomogeneous field is used to enhance the 6,328 A. output by reducing the competing effect of the 33,912 A. maser action.

---

The present invention relates in general to masers, and more particularly to the selection and control of maser transitions in an active medium capable of maser action on more than one transition.

As is now well known, masers operate on the principle of population inversion whereby an active medium of quantum resonant particles is excited so that a high energy state $E_2$ becomes over-populated relative to a lower energy state $E_1$. Under these conditions, there is a net amplification of electromagnetic radiation at the $E_2 \rightarrow E_1$ transition frequency $\nu_0 = (E_2 - E_1)/h$, where $h$ is Planck's constant.

The energy level structure of an active medium is often such that it is possible to obtain maser action on several different transitions. When it is desired to operate on one of these transitions, the uncontrolled existence of the other transitions can be undesirable. For example, when a number of possible transitions start from the same upper energy level, the initiation of maser action on an undesired one of these transitions can reduce the population inversion of the other transitions to the extent that maser action on these other transitions is seriously reduced or eliminated.

In accordance with the present invention, a technique is provided for selectively controlling or eliminating maser action on certain of the transitions in a multi-transition medium. Generally speaking, this is accomplished by the application of an inhomogeneous static field to the active medium which serves to broaden the radiation linewidth of a selected transition.

The various features and advantages of the present invention will become apparent upon a consideration of the following specification taken in connection with the accompanying drawing, wherein:

FIGURE 1 is an energy level diagram illustrating a maser transition;
FIGURE 2 is a plot of radiation intensity vs. frequency curves for the transition of FIGURE 1;
FIGURE 3 is a partially schematic elevational view of an optical maser in accordance with the present invention;
FIGURE 4 is a plot of output intensity vs. peak-to-peak magnetic field inhomogeneity for the optical maser of FIGURE 3;
FIGURE 5 is a partially schematic elevational view of an optical maser amplitude control system in accordance with the present invention;
FIGURE 6 is a fragmentary top view of another embodiment of an optical maser in accordance with the present invention; and
FIGURE 7 is a cross-sectional view of the optical maser of FIGURE 6 taken along line 7—7.

Referring to FIGURE 1, a quantum resonant particle (for example, an atom or a molecule) goes from a high energy quantum state $E_2$ to a lower energy quantum state $E_1$ by the emission of a photon (electromagnetic radiation) at the frequency $\nu_0 = (E_2 - E_1)/h$. In any active medium of such particles, the radiation will have a finite bandwidth $\Delta \nu$ about $\nu_0$ due to various interaction mechanisms. This is illustrated by the solid curve in FIGURE 2, where the linewidth $\Delta \nu_1$ is the frequency separation of the half-maximum intensity points. The threshold population inversion condition for maser action is proportional to $\Delta \nu$.

The application of a static field to the active medium has the effect of shifting the resonance frequency $\nu_0$ in accordance with the intensity of the field. For an electric field, this shift is known as the Stark effect; and for a magnetic field this shift is known as the Zeeman effect. If an inhomogeneous static field is applied, then the resonance frequency of those particles situated in a region of high field intensity is shifted by a greater amount than the resonance frequency of those particles situated in a region of lower field intensity and the net effect is to broaden the radiation linewidth $\Delta \nu$. This is illustrated by the broken curve of FIGURE 2, where $\Delta \nu_2$ is the half-maximum linewidth upon the application of an inhomogeneous field (varying from a positive intensity to a negative intensity with an average intensity of zero).

For a given excitation condition, and hence population inversion, the radiation linewidth $\Delta \nu$ can be broadened sufficiently to lessen the intensity of maser radiation, and then finally to completely prohibit maser action, on the transition $E_2 \rightarrow E_1$.

In accordance with the present invention, the maser operation is established on a selected transition which experiences little or no line broadening by comparison to other transitions in a multi-transition medium. Thus, maser action on the other transitions can be selectively controlled or eliminated. For example, the selected transition may have a substantially broader linewidth $\Delta \nu_1$ (in the absence of field inhomogeneity) than that of the other transitions, so that inhomogeneous fields of peak-to-peak intensity corresponding to a shift less than $\Delta \nu_1$ substantially affect only the linewidth of the other transitions. As a further example, the selected transitions may have a frequency shift coefficient (relating the resonance frequency shift to field intensity) sufficiently small that the effect of the inhomogeneous field is insignificant by comparison to its effect on the other transitions.

In the case of an optical maser (or laser) in which the active medium is a gas at low pressure, the linewidth is determined by the Doppler effect resulting from the thermal motion of the radiating particles. The Doppler linewidth is directional proportional to the frequency $\nu_0$ of the transition, and hence inversely proportional to the wavelength of the transition. For transitions having substantially the same field shift coefficients, inhomogeneous fields having a peak-to-peak intensity less than the Doppler line of the shortest wavelength transition will result in a line broadening of the longer wavelength transitions only.

As an example, consider the helium-neon optical maser in which the active medium is a mixture of helium and neon gases, typically 90% helium and 10% neon at a pressure of about 1 torr. Under proper conditions, the neon atoms of this maser give a continuous-wave visible red output at 6,328 A. a wavelength which is quite desirable, particularly because it can be readily observed visually and can be sensitively detected electronically. The neon atoms of the helium-neon mixture also exhibit an infrared maser transition at 33,913 A. which has the same upper energy state $E_2$ as the 6,328 A. transition. Because the 33,913 A. transition exhibits an extremely high single-pass gain through the active medium it can reduce the $E_2$ population (and hence intensity) available to the 6,328 A. transition, even when there is little or no multiple reflection of the 33,913 A. radiation back and forth through the active medium. However, since the Doppler width of the 6,328 A. transition is approximately six times as large as the Doppler width of the 33,913 A. while the magnetic field shift coefficients (g-factors) of the two transitions are substantially equal, the application of an inhomogeneous magnetic field in accordance with the present invention can be used to reduce the gain of the 33,913 A. transition without substantially affecting the 6,328 A. transition.

FIGURE 3 illustrates one embodiment of a helium-neon laser which has been built in accordance with the present invention. The plasma tube 1, containing the helium-neon mixture, is 60 cm. long and is excited to a glow discharge by an electrical excitation source 2. The optical radiation of the discharge passes through high optical quality windows 3 (oriented at Brewster's angle for maximum transmission of radiation polarized in the plane of incidence) to mirrors 4 which are dielectrically coated for maximum reflection at 6,328 A. The mirrors 4 cause multiple axial reflection of the 6,328 A. radiation 5 through the amplifying plasma tube 3 so as to establish self-sustaining oscillation at 6,328 A. The small 6,328 A. transmission through the right-hand mirror constitutes the output beam 6. In order to suppress the competing 33,913 A. radiation, an inhomogeneous magnetic field is generated by the current of variable D-C source 7 through coil 8 which is wound about the plasma tube 1. The coil, having 300 turns over a length of 40 cm., is divided into two oppositely-wound, series-connected, halves so that the magnetic fields 9 of the two halves are equal and opposite. The magnitude (in gauss) of the filed intensity at the center of each half-coil is 9.6 times the coil current (in amperes). Thus there is a peak-to-peak inhomogeneity $\Delta H$ of 19.2 gauss/ampere over a distance of about 15 cm.

In order to measure the effect of the inhomogeneous field on the 33,913 A. radiation alone, the left-hand 6,328 A. mirror 4 was replaced by a mirror coated for peak reflection at 33,913 A. resulting in a low-Q oscillation at 33,913 A. The measured 33,913 A. intensity through the right-hand mirror as a function of field inhomogeneity $\Delta H$ is shown in FIGURE 4. It is found that there is a uniform decrease of the 33,913 A. radiation from about 40 gauss to substantially total extinction (background fluorescence level) at 240 gauss. Since the Doppler width of the 6,328 A. radiation is six times that of the 33,913 A. radiation, the effect of the 240 gauss field at 6,328 A. is equivalent to the effect of a 40 gauss field at 33,913 A. resulting in only a slight line broadening which is more than offset by the beneficial effect of eliminating the 33,913 A. radiation (yielding a net increase in output intensity at 6,328 A. with both mirrors 4 dielectrically-coated for peak reflection at 6,328 A.).

FIGURE 5 illustrates a system for stablizing the amplitude of the 6,328 A. output by the effect of the inhomogeneous field on a competing 33,913 A. oscillation which is established by having a sufficient residual reflectance of the 6,328 A. mirrors 4 at 33,913 A. A portion of the 6,328 A. output 6 is reflected by partially-transparent mirror 11 to a photodetector 12 which developes a signal compared in comparator 13 with a standard signal from reference source 14. The output of compartor 13 is then applied (via amplifier 15) to the inhomogeneous field coil 8 to stabilize the 6,328 A. output. For example, if the 6,328 A. tends to decrease, the current through coil 8 is increased thereby decreasing the intensity of the 33,913 A. radiation. The decrease in the 33,913 A. intensity increases the upper state population available to the 6,328 A. transition, thereby providing the compensating tendency to increase the 6,328 A. output intensity. The amplitude stabilization of the embodiment of FIGURE 5 also serves to inhibit frequency changes due to non-linear effects of wave amplitude changes in the active maser medium, which is particularly important in any application in which the maser oscillation is used for purposes of wavelength or frequency measurement.

FIGURES 6 and 7 illustrate a high-gain, multi-wavelength, helium-neon optical maser embodiment which has been constructed in accordance with the present invention. Here a prism 17 is interposed between one of the Brewster windows 3 and an adjacent mirror 4. One of the equilateral sides of the prism 17 is disposed at Brewster's angle to the axis of plasma tube 1, and the prism angle is equal to the supplement of Brewster's angle.

The theory of the helium-neon prism laser is described in detail by co-inventor Arnold L. Bloom in the article "Observation of New Visible Gas Laser Transitions by Removal of Dominance," Applied Physics Letters, vol. 2, Mar. 1, 1963, pp. 101–102. Briefly, it may be stated that the 33,913 A. infrared as well as several visible transitions (including 6,401 A., 6,046 A., 6,351 A., 6,328 A., 6,293 A., 6,118 A. and 5,940 A.) all have a common upper energy state $E_2$. Since the 6,328 A. transitions has the highest gain, mirrors coated for maximum reflection at any of the visible wavelengths will still have sufficient reflectance at 6,328 A. that maser oscillation is established at this wavelength to the detriment of the other visible wavelengths. By introducing the prism 17 within the optical resonator (comprising the two optically-facing mirrors 4), the different wavelengths are dispersed by the prism through different angles. By positioning the off-axis mirror 4 exactly normally to the radiation at a given wavelength, only that wavelength is reflected back and forth between the two mirrors a sufficient number of times to sustain maser oscillation. Accordingly oscillation at the various visible wavelengths is "tuned-in," one at a time, by rotating the mount support off-axis mirror 4 through an angular range of about two minutes of arc, using the driving motion of a micrometer mechanism 18 to cause an elastic twisting of an end-wise-secured vertical supporting member 19.

Another feature of the prism laser relates to the fact that the 33,913 A. radiation is dispersed through a total of 5° less than the visible wavelength, thereby completely missing the off-axis mirror 4 and being eliminated from the optical resonator. Nevertheless, it has been found that the single-pass amplification of spontaneous emission at 33,913 A. (known as super-radiance saturation) can be sufficient to reduce the upper state population available to the visible transition, thereby seriously reducing the oscillation intensity on these transitions, particularly the weakest ones at 5,940 A. and 6,046 A.

In accordance with the present invention, a plurality of permanent magnets 21 are supported on the base plate 22 adjacent to the plasma tube 1. Each magnet is magnetized vertically to generate a fairly uniform vertical field 23 of intensity H within the plasma tube. The polarity of the magnets are then alternated along the length of the tube to give an inhomogeneity $\Delta H$ from magnet to magnet equal to 2H. In this particular embodiment the magnets 22 are of the ceramic type (molded from a slurry of barium and iron oxide powders) ¾ inch square in cross-section and 3 inches long, and eight such magnets are distributed over a plasma tube length of 120 cm. The resultant reduction in the gain of the 33,913 A. transition (and corresponding increase in the gain and power of the visible transitions) is so effective that the usual emission of 33,913 A. super-radiance from the tube is completely undetectable. This permits, for example, the insertion of lossy elements, such as modulating crystals, inside the optical resonator where the radiation intensity is several hundred times that of the output beam.

The use of permanent magnets as in FIGURE 6 has the advantage of eliminating the power requirements of a field coil as in FIGURE 3. It is to be noted, however, that the line-broadening field in FIGURE 6 is transverse to the direction of wave propagation so that this field should be directed at right angles to the polarization direction of the Brewster windows in order to obtain the maximum Zeeman effect.

We claim:

1. A maser, comprising: an active medium capable of maser action on more than one transition; means for establishing maser action on at least one of said transitions, the resonance frequency of said transition being substantially less affected by changes in the intensity of environmental fields than is the resonance frequency of at least one other of said transitions; and means applying an inhomogeneous field to said active medium for broadening the radiation linewidth of said other transition without substantially affecting the radiation linewidth of said one transition, said inhomogeneous field having a magnitude to suppress maser action on said other transition without suppressing maser action on said one transition.

2. A maser according to claim 1 wherein said inhomogeneous field has a maximum value and a minimum value at different locations in said active medium, the difference between said maximum value and said minimum value being the peak-to-peak intensity of said inhomogeneous field, and the peak-to-peak intensity of said inhomogeneous field is less than that value which shifts the resonance frequency of said one transition by an amount equal to the radiation linewidth of said transition in the absence of environmental fields.

3. A maser according to claim 1 wherein said active medium is a gas at low pressure, said means for establishing maser action includes an optical resonator, said one transition is at an optical wavelength, and said other transition is at an optical wavelength which is longer than that of said one transition.

4. A maser according to claim 3 wherein the peak-to-peak intensity of said inhomogeneous magnetic field is less than that value which shifts the resonance frequency of said one transition by an amount equal to the Doppler linewidth thereof.

5. A maser according to claim 3 wherein said inhomogeneous field is a magnetic field.

6. A maser according to claim 5 wherein said active medium includes neon atoms, said longer transition being at a wavelength of approximately 33,913 A, and said shorter wavelength transition being a visible transition having a common upper energy level with said 33,913 A transition.

7. A maser according to claim 3 including means positioned within said optical resonator for spatially dispersing the optical radiation emission of said active medium as a function of wavelength so that only that visible radiation of a selected wavelength is reflected through said active medium a sufficient number of times to establish maser oscillation.

8. A maser according to claim 1 including a plurality of permanent magnets distributed along said active medium to produce said inhomogeneous field and thereby substantially suppress any radiation amplification at said other transition.

9. A maser according to claim 1 wherein said inhomogeneous field has a maximum value and a minimum value at different locations in said active medium, the difference between said maximum value and said minimum value being the peak-to-peak intensity of said inhomogeneous field, and including means for detecting the output intensity of maser radiation on said one transition, and means responsive to said intensity for controlling the peak-to-peak intensity of said inhomogeneous field thereby stabilizing said intensity by the effect of the radiation line broadening of said other transition on the gain of said one transition.

10. A maser according to claim 1 wherein said inhomogeneous field is a static field.

References Cited

UNITED STATES PATENTS

| | | | |
|---|---|---|---|
| 3,213,281 | 10/1965 | Nedderman | 331—94.5 |
| 3,243,722 | 3/1966 | Billings | 331—94.5 |
| 3,277,396 | 10/1966 | Statz et al. | 331—94.5 |

OTHER REFERENCES

Bloom, Observation of New Visible Gas Laser Transitions by Removing of Dominance. Applied Phys. Letters. vol. 2, No. 5 (Mar. 1, 1963) pp. 101 and 102.

Spectra-Physics, advertisement of C. W. Gas Laser. Electronics, (May 3, 1963) p. 76.

Spectra-Physics circular on their Model 116 High-Gain/Multi-Wavelength Gas Laser. Received by the Patent Office Oct. 10, 1963.

JEWELL H. PEDERSEN, Primary Examiner

W. L. SIKES, Assistant Examiner

UNITED STATES PATENT OFFICE
CERTIFICATE OF CORRECTION

Patent No. 3,464,024

August 26, 196

William E. Bell et al.

It is certified that error appears in the above identified patent and that said Letters Patent are hereby corrected as shown below:

Column 1, lines 25 and 29, "33,912", each occurrence, should read -- 33,913 --. Column 2, line 65, "directional" should read -- directly --. Column 3, line 44, after "coil" insert -- 8 --; line 47, "filed" should read -- field --. Column 4, line 3, "compartor" should read -- comparator --; line 48, "support" should read -- supporting --.

Signed and sealed this 11th day of August 1970.

(SEAL)
Attest:

Edward M. Fletcher, Jr.
Attesting Officer

WILLIAM E. SCHUYLER, JR.
Commissioner of Patents